US00RE39504E

(19) United States
(12) Reissued Patent
Scates et al.

(10) Patent Number: US RE39,504 E
(45) Date of Reissued Patent: Mar. 13, 2007

(54) COUNTERBALANCE SYSTEM FOR UPWARD ACTING DOOR

(75) Inventors: John E. Scates, Carrollton, TX (US); LeRoy G. Krupke, Carrollton, TX (US); Richard K. Hoofard, Dallas, TX (US); D. Scott Boucher, Rowlett, TX (US)

(73) Assignee: Overhead Door Corporation, Lewisville, TX (US)

(21) Appl. No.: 10/277,442

(22) Filed: Oct. 22, 2002

Related U.S. Patent Documents

Reissue of:
(64) Patent No.: 6,134,835
Issued: Oct. 24, 2000
Appl. No.: 09/096,663
Filed: Jun. 12, 1998

(51) Int. Cl.
*E05F 11/00* (2006.01)

(52) U.S. Cl. ..... 49/200; 49/197; 160/191
(58) Field of Classification Search ..... 49/197, 49/199, 200; 160/191, 192, 201, 315, 133; 16/DIG. 1
See application file for complete search history.

(56) References Cited

U.S. PATENT DOCUMENTS 2,257,484 A * 9/1941 Rowe ..... 160/191
2,294,360 A * 9/1942 Blodgett ..... 160/191
2,786,231 A * 3/1957 Robinson ..... 160/191
3,038,535 A * 6/1962 Stroup et al. ..... 160/191
3,412,423 A * 11/1968 Binns ..... 160/191
4,731,905 A * 3/1988 Milano et al. ..... 16/306
4,817,927 A * 4/1989 Martin ..... 267/155
4,852,378 A * 8/1989 Greco ..... 72/379
4,882,806 A * 11/1989 Davis ..... 16/198
4,930,182 A * 6/1990 Eichenberger ..... 16/198
4,981,165 A * 1/1991 Miller et al. ..... 160/191
5,239,777 A * 8/1993 Husselton ..... 49/200
5,275,223 A * 1/1994 Magro et al. ..... 160/191
5,419,010 A * 5/1995 Mullet ..... 16/198
5,577,544 A * 11/1996 Carper et al. ..... 160/191
5,632,063 A * 5/1997 Carper et al. ..... 16/198
5,636,678 A * 6/1997 Carper et al. ..... 160/191
5,671,500 A * 9/1997 Balk ..... 16/72
5,865,235 A 2/1999 Krupke et al.
6,125,582 A * 10/2000 Mondragon et al. ..... 49/200

FOREIGN PATENT DOCUMENTS

FR 2 578 893 A1 9/1986
FR 2595746 A2 9/1987

* cited by examiner

*Primary Examiner*—Jerry Redman
(74) *Attorney, Agent, or Firm*—Gardere Wynne Sewell LLP

(57) ABSTRACT

A counterbalance system for an upward-acting door includes spaced-apart wall brackets and cable drums supported on the brackets and connected to flexible cables which depend from the drums and connected to the lower side edges of an upward-acting sectional garage door. One or both of the cable drums may be connected to one end of a torsion coil spring and the opposite end of each spring is connected to a hub assembly. Elongated spring winding and protective cover tubes are sleeved over the springs and are connected to the brackets by worm-gear drive winding mechanisms, respectively, for rotating the tubes to effect winding of the torsion coil springs through the hub assemblies but preventing rotation of the tubes during normal operation of the counterbalance system. The cable drums and spring hub assemblies may be supported on an elongated synchronizing shaft or a torque transfer shaft extending between and supported on the wall brackets.

36 Claims, 10 Drawing Sheets

COUNTERBALANCE SYSTEM FOR UPWARD ACTING DOOR

Matter enclosed in heavy brackets [ ] appears in the original patent but forms no part of this reissue specification; matter printed in italics indicates the additions made by reissue.

FIELD OF THE INVENTION

The present invention pertains to a counterbalance system for an upward acting door, such as a sectional garage door.

BACKGROUND

Various types of mechanisms have been developed for counterbalancing the weight of upward acting doors, particularly sectional garage doors, so as to minimize the effort of opening and closing the door and to minimize the power requirements of power operated door opening and closing mechanisms. One widely used type of counterbalance mechanism comprises, generally, spaced apart cable drums mounted on a shaft supported on a wall adjacent to the door opening and connected to flexible cables which, in turn, are connected to lower opposed edges of the door. Typically, one or more torsion springs are sleeved over the shaft, keyed to the shaft for exerting a torsional effort thereon and on the cable drums. One end of the spring or springs must, of course, be anchored or stationary with respect to the shaft to provide for the torsional windup and unwinding which occurs during closing and opening movement of the door and during adjustment of the springs to provide a suitable counterbalance effect.

Several problems have persisted in the development of suitable counterbalance mechanisms for upward acting doors of the general type discussed herein. There is the ever present need to reduce the cost and maintain the reliability and ease of operation of such mechanisms, particularly, counterbalance mechanisms which require multiple torsion springs for larger doors. Moreover, various arrangements of conventional spring attachment mechanisms comprising collars connected to one end of the springs and locked to the cable drum shaft with setscrews have been a cumbersome and inaccurate arrangement for setting and adjusting the counterbalance torque of the spring or springs. Various types of spring adjustment mechanisms have been developed, including mechanisms which utilize a worm gear drive, in an effort to overcome the problems associated with collar-type spring anchors and adjustment devices. However, prior art counterbalance spring adjustment mechanisms have been difficult to use, particularly if they are centered or disposed substantially inboard of the spaced apart support brackets for the counterbalance cable drums.

Still further, prior art counterbalance mechanisms with worm gear drive adjustment devices have been somewhat complex, expensive to manufacture, difficult to operate and service and have otherwise been plagued with shortcomings which have made it desirable to seek further improvements in counterbalance systems for vertical opening doors, including sectional garage doors used in commercial and residential buildings and garages.

SUMMARY OF THE INVENTION

The present invention provides an improved counterbalance system for an upward acting or vertical opening door, particularly a sectional garage door.

In accordance with one aspect of the invention a door counterbalance system is provided wherein access to the counterbalance adjustment mechanism is convenient, the torsion springs can be adjusted using a manual or power wrench which engages an improved self-locking worm gear drive mechanism whereby the spring tension cannot be released suddenly and adjustment is carried out only gradually through turning of the worm gear mechanism.

In accordance with another aspect of the present invention a door counterbalance system is provided with a single torsion spring or opposed torsion springs which are disposed in spring enclosing tubes, which tubes are stationary during normal operation of the door but are connected at one end to a spring torque adjustment mechanism and at the other end to a spring winding cone or hub assembly which, in turn, is attached to the counterbalance spring disposed within the tube. The hub assembly is connected to the spring enclosing tube for rotation therewith and for axial sliding movement in the tube to accommodate spring axial growth and contraction. The torsion spring enclosing tubes also provide a protective cover, substantially eliminate touch access to the active coils of the springs and provide an improved aesthetically pleasing appearance. Moreover, the springs are not susceptible to gathering dirt or debris in environments where such is prevalent.

Still further in accordance with the invention a torsion spring counterbalance system is provided for an upward acting garage door and the like wherein the counterbalance mechanism does not require any setscrews or key and keyway arrangement for connecting one end of the spring to a drive shaft. The spring is connected at one end to a cone or spring hub which is attached directly to a cable drum, and sleeved over a synchronizing and support shaft for the cable drums. In this way, all torque exerted by the springs of dual opposed spring systems is transferred directly to the respective cable drums and is not required to be transferred through setscrews or other types of connections between the cable drums and a support shaft. Each spring is connected at its opposite end to a cone or hub assembly which is stationary during normal operation of the mechanism, is disposed within the spring covering tube and is non-rotatable relative to the tube, but may be axially slidable along the tube to allow the spring coils to axially expand and contract.

The torsion spring counterbalance system of the present invention may also include a unique spring winding counter for each spring whereby counterbalance mechanisms with dual opposed springs may be adjusted, using the counters, as regards the torsional effort exerted by the respective springs on each cable drum.

The door counterbalance of the present invention is also adapted to be easily mounted on and demounted from spaced apart wall support brackets to facilitate installation, servicing and removal of the system, when required.

The counterbalance system of the present invention still further, requires only one point of attachment between the system and a cable drum support shaft, when needed, such point of attachment being at the drum itself.

Those skilled in the art will further appreciate the above-mentioned advantages and superior features of the counterbalance system of the present invention upon reading the detailed description which follows in conjunction with the drawings.

DETAILED DESCRIPTION OF THE PREFERRED EMBODIMENTS

Figure 1:
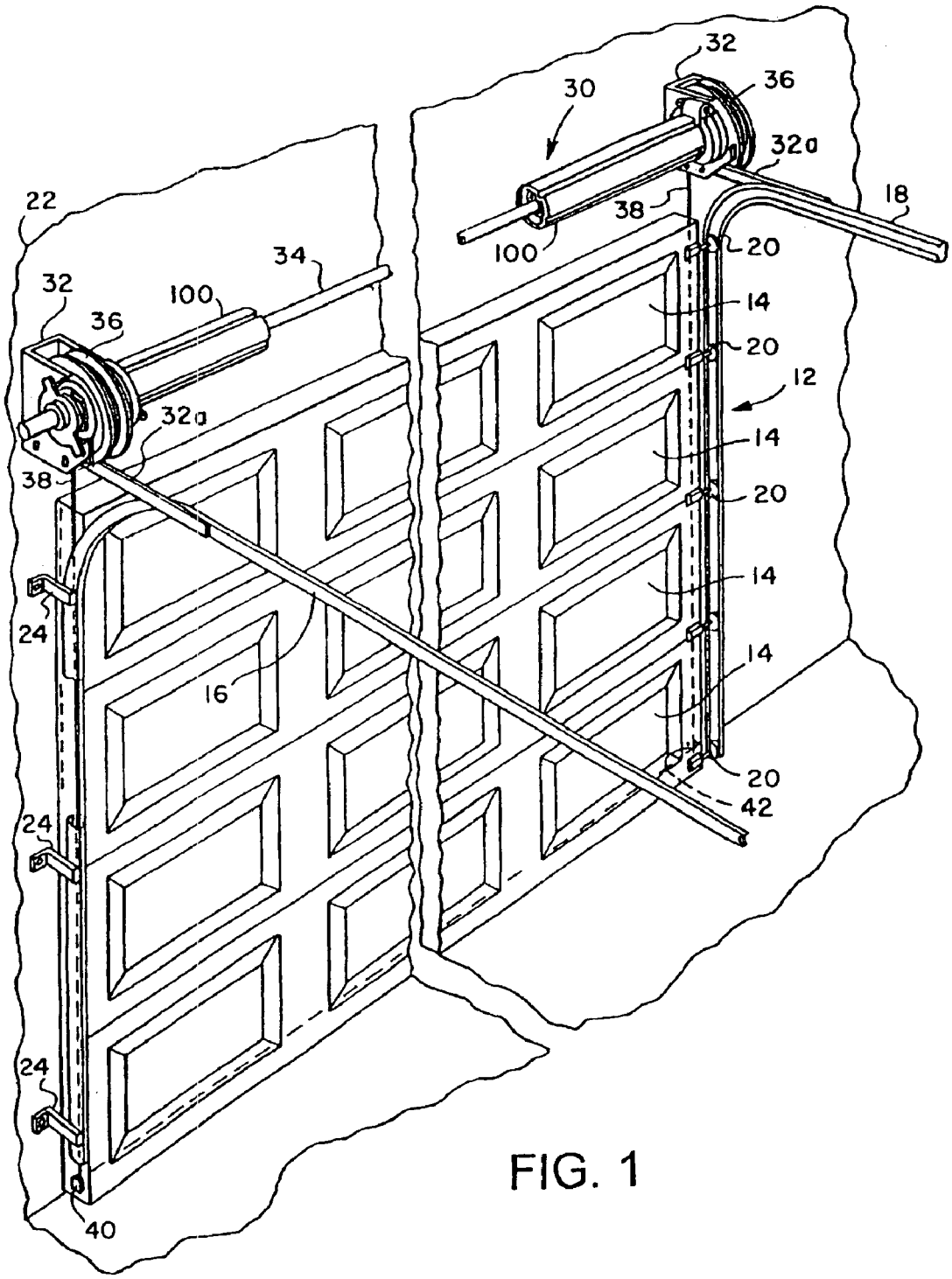
FIG. 1 is a perspective view of a conventional upward acting sectional garage door which includes one preferred embodiment of a counterbalance system in accordance with the present invention.

In the description which follows like parts are marked throughout the specification and drawing with the same reference numerals, respectively. The drawing figures are not necessarily to scale and certain features may be shown in generalized or schematic form in the interest of clarity and conciseness.

Referring to FIG. 1, there is illustrated a conventional sectional upward acting garage door, generally designated by the numeral 12. The door 12 is made up of plural, generally rectangular panels 14 which are suitably interconnected by hinge means between adjacent panels, not shown in detail in FIG. 1. However, the door 12 may be constructed in accordance with the invention described in co-pending patent application entitled: Sectional Door With Pinch Resistant Hinge Between Door Sections, Ser. No. 09/096, 842, filed of even date herewith and assigned to the assignee of the present invention.

The door 12 is adapted to be guided for movement between the closed position shown and an open position by opposed generally channel shaped guide tracks 16 and 18. Spaced apart guide rollers 20, one set shown for the right side of the door 12, are mounted on opposite side edges of the door sections 14 for supporting the door in the open and closed positions on the guide tracks 16 and 18 and for guiding the door between the open and closed positions. The door 12 is shown in a closed position covering an opening, not shown, in a generally vertical wall 22. The guide tracks 16 and 18 are supported on suitable brackets 24 connected to the wall 22, one set of brackets shown for the track 16 in FIG. 1. The door 12 may be manually operated to move between open and closed positions or operated by a suitable power actuated opening mechanism, not shown.

Figures 2, 2A:
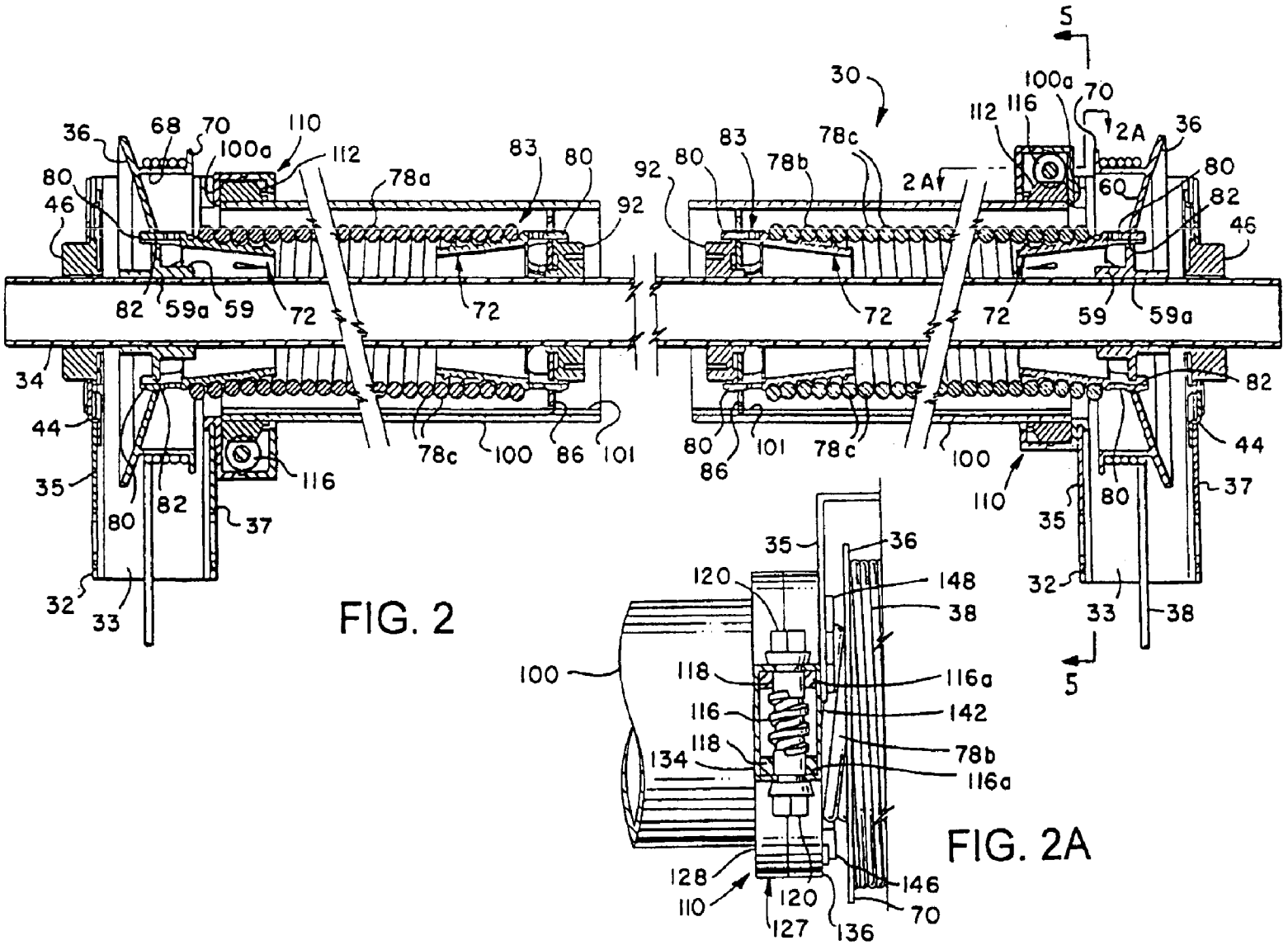
FIG. 2 is a central section view of the counterbalance system, taken generally along the line 2—2 of FIG. 1.
FIG. 2A is a section view taken from line 2A—2A of FIG. 2.

Referring further to FIG. 1, and also FIG. 2, an improved counterbalance system in accordance with the invention, generally designated by the numeral 30, is shown mounted on the wall 22, above the door 12 in the door closed position, and is operable to counterbalance the weight of the door for ease of movement thereof between open and closed positions. The counterbalance system 30 includes spaced apart support brackets 32 which are adapted to be suitably mounted on wall 22, or a ceiling or other stationary structure, may be suitably connected to tracks 16 and 18, respectively, by tie rods 32a, and are adapted to support an elongated rotatable tubular shaft 34 therebetween in a manner to be described in further detail herein. The shaft 34 is preferably a cylindrical tube adapted to support two spaced apart cable drums 36, each of which has wound thereon an elongated flexible cable 38. The cables 38 have respective distal ends which are connected at points 40 and 42, FIG. 1, to the lowermost door panel 14 at opposite side edges thereof, as shown. In this way the cables 38 may be wound onto and off of the drums 36 as the door moves between open and closed positions in a generally known manner. Although cable drums and cables are shown and described, equivalent devices may be used, including sprockets and chains, drums and flexible belts and other devices wherein a rotatable member is operable to wind an elongated flexible member thereon, the free end of which flexible member is connected to the door.

Figure 3:
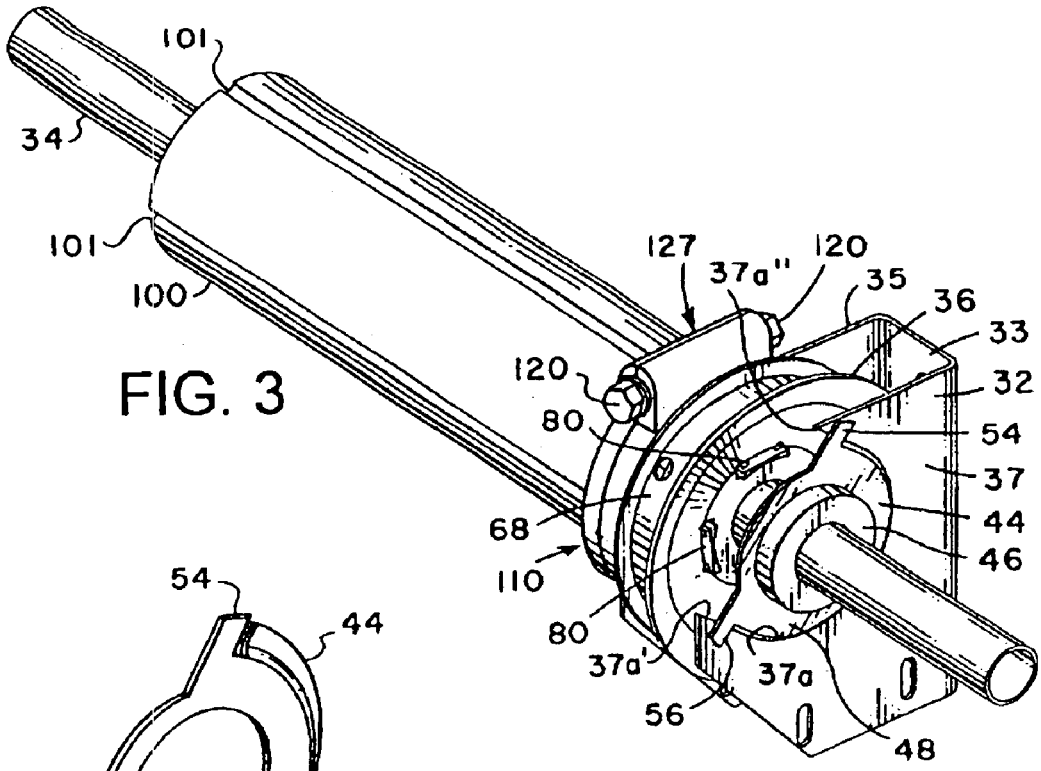
FIG. 3 is a left perspective view of one of the system support brackets and associated structure including a spring enclosing tube for the counterbalance system of the present invention.
Figure 5:
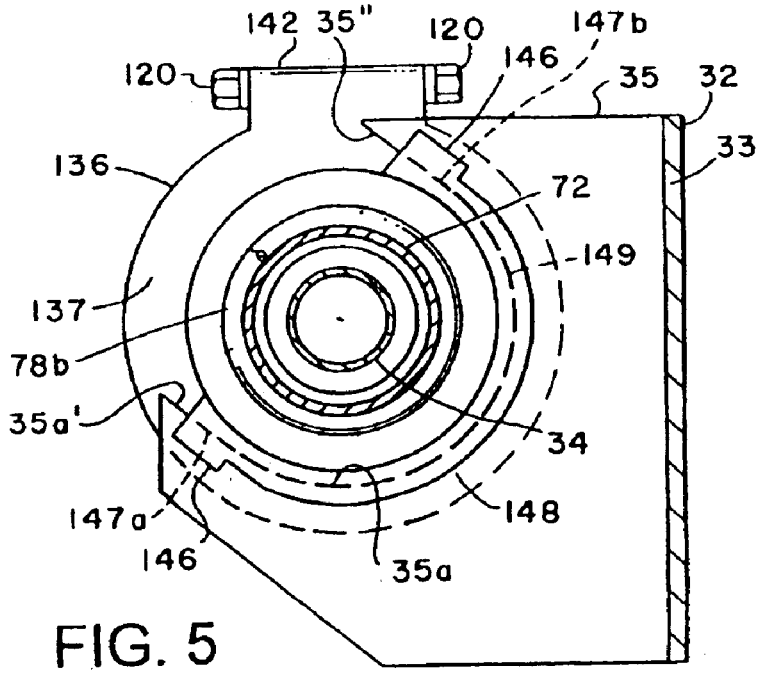
FIG. 5 is a section view taken generally along the line 5—5 of FIG. 2.
Figure 6:
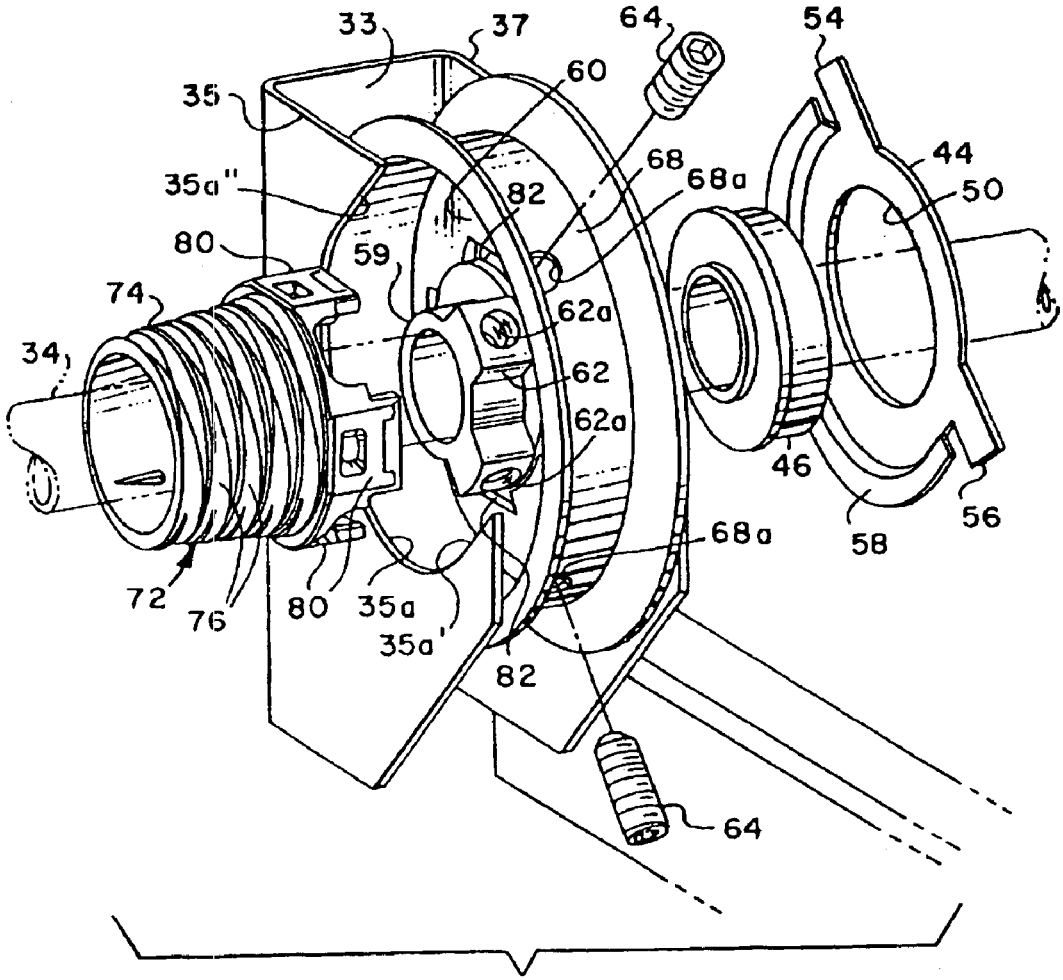
FIG. 6 is an exploded perspective view of one of the cable drums, a support bracket, an associated spring cone or hub member, a drum shaft support bearing and the bearing retainer shown in FIG. 4.

Referring now to FIGS. 2 and 3, each of the support brackets 32 is preferably characterized as a generally channel shaped member having a web or base part 33 and opposed generally parallel flanges 35 and 37 projecting substantially normal to the base part. As shown in FIGS. 5 and 6, the flange 35 has a generally arcuate U-shaped slot 35a formed therein including opposed parallel sidewalls 35a' and 35a". As shown in FIG. 3, the flange 37 has a similar arcuate somewhat U-shaped slot 37a formed therein including sidewalls 37a' and 37a". The slots 35a and 37a extend at an angle of about 45° to 50° with respect to the base 33 and open upwardly and outwardly away from wall 22 when the brackets 32 are mounted on such a vertical wall. The slots 35a and 37a of the respective brackets 32 are adapted to releasably support a bearing retainer plate 44 therein, see FIGS. 2 and 3, which retainer plate is adapted to support a rolling element bearing 46, FIGS. 2 and 3. The bearings 46 are of conventional construction and of a type commercially available. The bearings 46 are adapted to support the tubular shaft 34 for rotation relative to the brackets 32.

Figure 4:
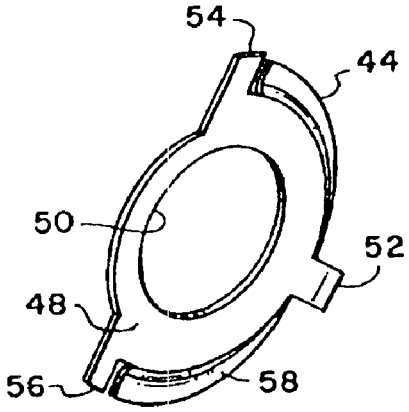
FIG. 4 is a perspective view of a bearing retainer member for the counterbalance system of the present invention.

Referring briefly to FIG. 4, the retainer plates 44 each include a generally planar hub portion 48 having a central bore 50 formed therein for receiving a bearing 46 in force fitted relationship. The hub portion 48 has a first retaining finger 52 projecting substantially normal to opposed second and third retainer fingers 54 and 56, as shown. A generally arcuate flange 58 is integrally formed as art of the retainer plate 44 and projects in a plane generally parallel to and spaced from a plane which includes the hub portion 48 and the fingers 52, 54 and 56. Accordingly, as shown in FIG. 3, a retainer plate 44 may be engaged with the flange 37 of a support bracket 32 wherein the flange 58 is disposed on one side of the slot 37a and engaged with bracket flange 37 and the fingers 52, 54 and 56 are disposed in the slot and engaged with other side of the flange 37 to retain the bearing 46 supported on the bracket 32, as shown. A retainer plate 44 also supports the other bearing 46 on the other bracket 32, as shown in FIG. 2, in a mirror image position engaged with bracket flange 35.

Referring now to FIGS. 2 and 6, each of the cable drums 36 includes a hub portion 59 formed integral with a radially projecting circumferential disc shaped flange 60. The hub 59 includes a central axial bore 59a for slidably receiving the tubular shaft 34 therein. The hub 59 also includes radially projecting circumferentially spaced bosses 62, see FIG. 6, which are provided with suitable radially extending threaded bores 62a for receiving respective setscrews 64 therein, as shown in FIG. 6, and which are adapted to forcibly engage the shaft 34 to releasably secure the cable drums 36 non-rotatable with respect to the shaft 34.

Referring further to FIG. 2 and FIG. 6, each of the cable drums 36 also includes a circumferential cable support rim 68 having suitable spaced apart bores 68a, FIG. 6, formed therein to provide access to and for the setscrews 64. A circumferential flange 70 is formed integral with the rim 68 and is spaced from the flange 60 to contain plural wraps of cable 38 on the drum 36.

Each cable drum 36 is also provided with a coaxial and axially extending spring support cone or hub member 72 including a frustoconical tubular part 74 having suitable grooves 76 formed thereon for engaging the coils of respective torsion springs 78a or 78b, FIG. 2, which are disposed in sleeved relationship over the shaft 34 as shown. The spring hubs 72 are each provided with plural, integral circumferentially spaced and axially projecting fingers 80 which project into corresponding slots 82, FIGS. 2 and 6, formed in the drum flange 60 as shown for interconnecting the cable drum directly with the spring hub member. The fingers 80 are preferably plastically deflectable after being mounted to the drum flange 60 to lock the hub 72 to the drum 36. The hubs 72 are also preferably of a type generally as described in further detail in co-pending U.S. patent application Ser. No. 08/787,791, filed Jan. 23, 1997, assigned to the assignee of the present invention and in Canadian Patent Application No. 2,184,507, the subject matter of which, for both documents, is incorporated herein by reference.

Figure 7:
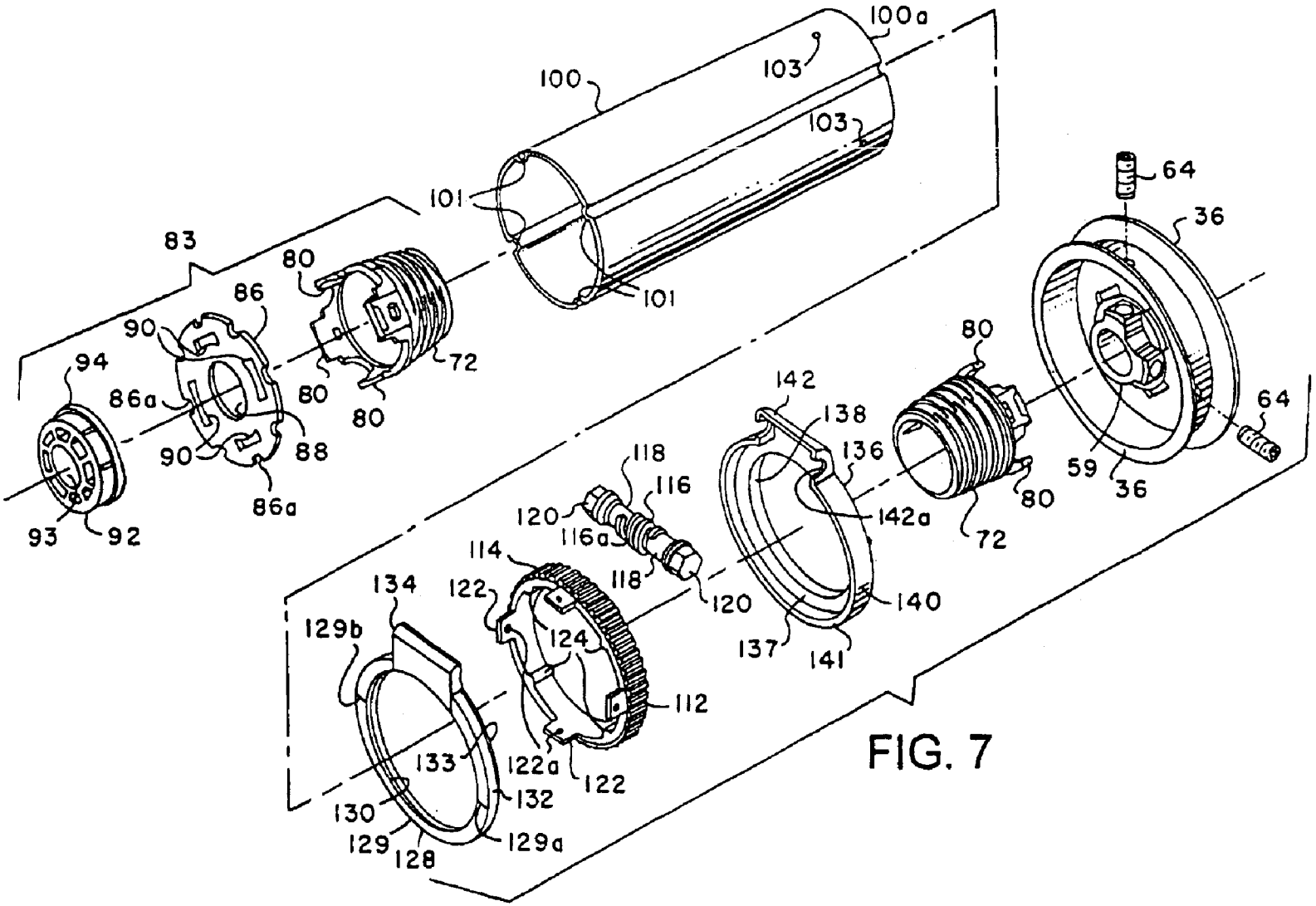
FIG. 7 is an exploded perspective view of one of the spring cover and torque tubes, a stationary spring support cone or hub assembly and one preferred embodiment of a winding mechanism in accordance with the invention.

Referring further to FIGS. 2 and 7, the opposite end portions of the springs 78a and 78b are also forcibly and non-rotatably engaged with respective ones of spring hub assemblies 83, as shown, each of said hub assemblies including a spring hub 72 whose axially projecting fingers 80 are engaged with a cylindrical disc key plate 86 having a central bore 88 form therein. As shown in FIG. 7, the key plate 86 is provided with at least four circumferentially spaced slots 90 for receiving the fingers 80 of a spring hub 72 in such a way that the fingers project through the slots and are engageable with a cylindrical hub support bushing 92 adapted to support the spring hub assembly 83 on the shaft 34 axially slidable on the shaft and rotatable relative to the shaft. A central bore 93 is formed in the bushing 92 for receiving the shaft 34 slidably and rotatably therein. The bushing 92 is provided with a circumferential, radially extending flange 94 which is engaged by the distal ends of the fingers 80 which are plastically deflected to lock the hub 72, key plate 86 and bushing 92 together to form the hub assembly 83.

As further shown in FIGS. 2 and 7, in particular, each key plate 86 includes plural circumferentially spaced radially inwardly projecting key ways or notches 86a, formed therein. Each hub assembly 83 is also adapted to be disposed in an elongated torsion spring cover and winding tube 100 axially slidable but non-rotatable with respect to such tube. In this regard, the keyways 86a are operable to engage corresponding radially inwardly projecting and axially extending key portions 101 which are circumferentially spaced apart on tube 100. Each winding tube 100 is preferably formed as a cylindrical tube of substantially constant diameter suitably fabricated to provide the axially extending radially inwardly projecting key portions 101 engageable with the key plates 86 of the respective hub assemblies 83. Accordingly, as shown in FIG. 2, the springs 78a and 78b are shown in a wound condition with coils 78c touching or closely adjacent each other. When the springs 78a and 78b are unwound or relaxed gaps exist between the spring coils 78c. Normally, however, as the springs are wound the hub assemblies 83 may be axially slidable in the tubes 100 but are not required to be. The tubes 100 are, preferably, cylindrical although other cross-sectional shapes and key configurations may be provided, as will be appreciated by those skilled in the art. For example, if the cross-sectional geometry of the tube is a polygon the key plate 86 may have a corresponding geometry and be dimensioned to fit slidable within the tube but be non-rotatable relative to the tube.

Referring further to FIGS. 2, 5 and 7, each of the tubes 100 is connected to a torsion spring winding mechanism, generally designated by the numeral 110, which mechanism is adapted to be supported on a bracket 32 in a manner to be described in further detail herein. One end 100a of the tube 100 is engaged with a cylindrical ring gear 112 of a worm gear drive. The ring gear 112 has conventional circumferential gear teeth 114 formed thereon and engageable with a worm gear 116, see FIGS. 2A and 7. The worm gear 116 has opposed trunnion portions 118 formed thereon and distal hex head drive tangs 120, FIGS. 2A and 7. The ring gear 112 includes circumferentially spaced axially projecting finger parts 122 and circumferentially spaced radially inwardly projecting integral key parts 124, as shown in FIG. 7. Each of the finger parts 122 has a radially inwardly projecting boss 122a which is registrable in a cooperating recess 103 of the tube 100 adjacent the tube end 100a, see FIGS. 7 and 8. Accordingly, the ring gear 112 may be sleeved over the tube end 100a and is non-rotatably engageable with the tube 100 whereby the key parts 124 fit in the grooves which form the inwardly projecting axial keys 101 of the tube, and the finger parts 122 are resiliently deflectable such that, upon assembly of the ring gear 112 to the tube 100, the bosses 122a engage the tube at the recesses 103 and the ring gear 112 is both axially locked on the tube and non-rotatable relative to the tube 100.

Figure 8:
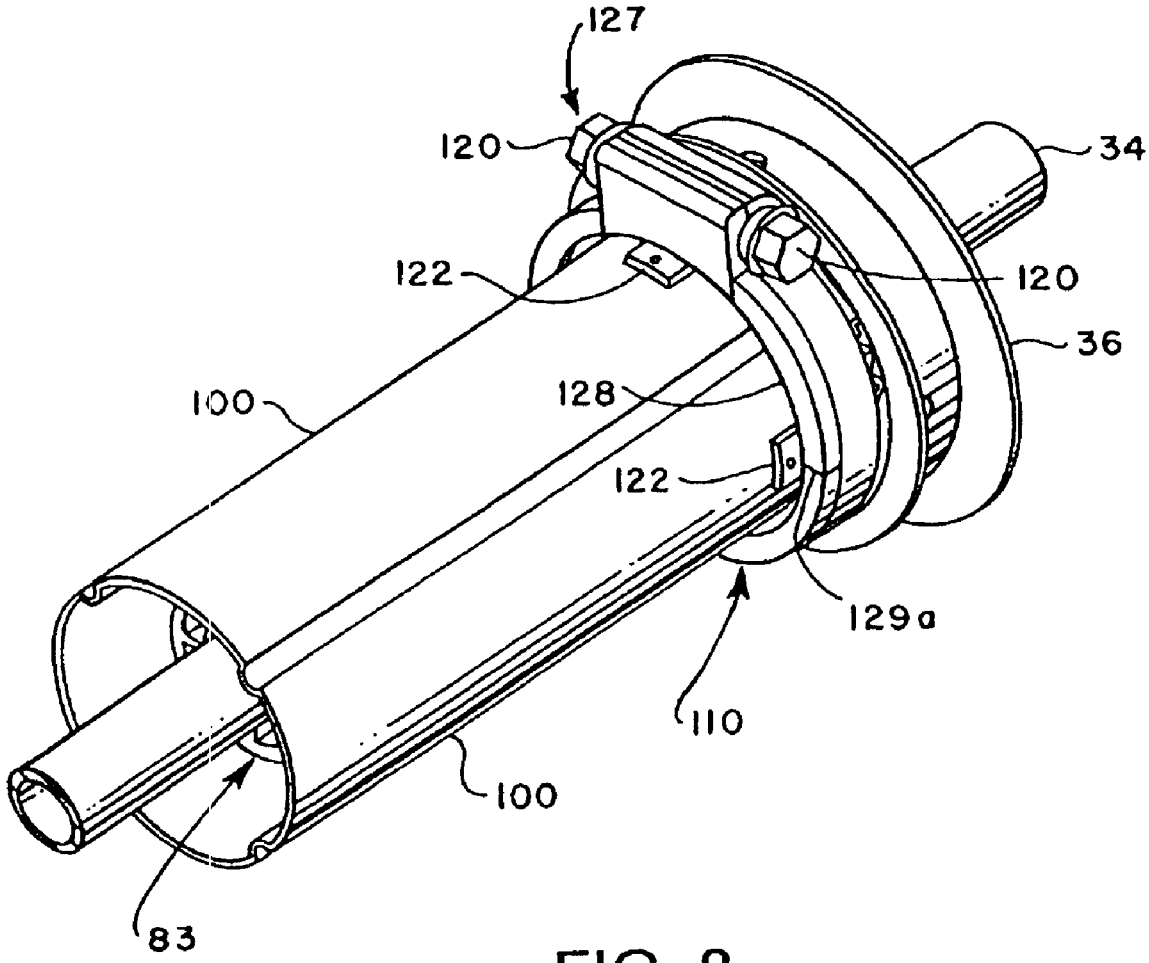
FIG. 8 is a perspective view of the structure shown in FIG. 7 in an assembled condition.

Referring further to FIGS. 7 and 8, the winding mechanism 110 includes a casing 127 including first case part 128 comprising a generally circular ring-shaped member having a suitable cylindrical bore 130 formed therein and an axially extending stepped outer wall portion 132, 133 extending parallel to the axis of the bore 130. A radially projecting casing part 134 is integrally formed with the wall portion 132 and forms part of a housing for the worm 116. An opposed casing part 136 is adapted to be engageable with the casing part 128 and is provided with a cylindrical axial bore 138 of slightly smaller diameter than the bore 130 and the outer diameter of the tube 100, FIG. 7. An axially extending circular wall 140 defines a recess 141 adapted to engage the wall 132, 133 of the casing part 128 to form a closure to enclose the ring gear 112. The casing part 136 also includes a radially extending part 142 which cooperates with the part 134 to form an enclosure for the worm 116. Transverse walls 129 and 137, FIG. 7, of the casing parts 128, 136 are positioned such that when the two casing parts are engaged with each other, the ring gear 112 and the worm 116 are substantially enclosed within the enclosure formed thereby. The worm 116 may be supported on spaced apart bushings 116a, FIG. 2A, disposed in the casing 127, as shown.

Referring briefly to FIG. 2A and primarily to FIG. 5, the casing part 136 is provided with opposed spaced apart tabs 146 and an arcuate flange 148 formed integral with a generally cylindrical hub 149 and spaced from a casing part wall 137 to form a somewhat U-shaped groove for receiving the flange 35 or 37 of the wall bracket 32 in such a way that the casing 127 is supported by the wall bracket and is non-rotatable with respect to the wall bracket. The linear wall portions 35a' and 35a" of the flange 35 defining part of the slot 35a cooperate with surfaces 147a and 147b, FIG. 5, of the casing part 136 to hold the casing 127 non-rotatable relative to the wall bracket 32.

The worm 116 is suitably journaled within the casing 127 as described above for rotation therein. The configuration of the continuous gear tooth 116a of the worm 116 and the teeth 114 of ring gear 112 is such that the ring gear 112 cannot be reverse driven by the tube 100 and thus the tube 100 cannot rotate relative to the wall bracket 32 unless the worm 116 is purposely rotated by engaging one of the opposed tangs 120 with a suitable tool, for example. In this way, each of the spring protective winding tubes 100 is maintained stationary relative to the wall bracket 32 to maintain a pre-determined torsional wind-up of the springs 78a and 78b, respectively, to control the counterbalance effort exerted by the drums 36 through the cables 38 on the door 12.

An important aspect of the present invention pertains to the fact that, for a door such as the door 12 wherein opposed cable drums 36 are each connected to a torsion spring and winding mechanism as described, essentially no torque is transmitted by the shaft 34 during operation of the door and the counterbalance system 30. Each drum 36 is connected directly to an end portion of a torsion spring 78a or 78b through a respective hub 72, as shown, and non-rotatable relative to the spring end portion. As previously described, the opposite ends of the respective torsion springs 78a and 78b are operably fixed to the stationary support brackets 32, respectively. Accordingly, the springs 78a and 78b are not fixed to a torsion shaft but the torque from these springs, respectively, is transmitted directly to the associated cable drum 36. The shaft 34, essentially, only synchronizes the rotation of the drums 36 when these drums are secured to the shaft by their respective setscrews 64. In fact, the drums 36 may be suitably mounted on bearings interposed their respective hubs 59 and the shaft 34 and allowed to rotate independent of each other in accordance with the configuration of the cable drums described in co-pending patent application Ser. No. 08/787,791.

It will also be appreciated by those skilled in the art that the wall brackets 32 may be configured such as to only support the shaft 34 and the cable drums mounted thereon while the winding mechanisms 110 are supported by separate brackets or similar structure which is mounted on the wall 22 or in some other manner held stationary with respect to the wall 22. In other words, suitable support structure may be provided for supporting the shaft 34 and the drums 36 independent of other structure which may be adapted to support the winding mechanism 110 for holding the tubes 100 stationary with respect to the wall 22. For example, separate support brackets may be provided for supporting the winding mechanisms 110, which brackets may be mounted on the wall 22 or otherwise held stationary with respect to the wall.

The torsion spring winding mechanism described hereinbefore and in conjunction with FIGS. 2, 5 and 7 may, of course, be utilized on both sides of the door 12 for exerting substantially equal counterbalance tension on the cables 38. The assembly of the winding mechanism 110 shown in FIG. 8, wherein the drive tangs 120 for the worm 116 of the winding mechanism 110 are oriented in a substantially horizontal direction above the tube 100 may be inverted for use on the opposite end of the door wherein the drive tangs 120 are oriented in a horizontal direction beneath the associated tube 100. Accordingly, by merely turning the mechanism illustrated in FIG. 8, end-for-end, and inserting the casing part 136 in slot 37a of the other support bracket 32 a winding mechanism 110 including a tube 100 is usable on both sides of the door 112.

The amount of torsional windup of the springs 78a and/or 78b may, for certain applications of the counterbalance system, be pre-determined in accordance with the weight of the door, for example. Moreover, and perhaps more importantly, it is desirable to synchronize the torsional windup between the springs 78a and 78b as regards the number of turns of winding imposed on the springs so that the springs exert a substantially balanced effort. Even though the cable drums 36 may be synchronized for exerting a counterbalance effort on the door 12, the springs 78a and 78b, desirably, should exert substantially the same effort. The winding mechanism 110 for the counterbalance system 30 does not require a separate counter mechanism to determine the number of windings imposed on the respective springs 78a and 78b. For example, by providing suitable indicia or reference marks 129a and 129b, see FIGS. 7 and 8, on the casing part 128, where shown, the number of windings imposed on each of the springs may be determined by counting the number of projections 122 which pass the associated reference marks as the springs are being wound. Accordingly, the springs 78a and 78b may be wound or unwound within at least a quarter turn of each other, or less, by comparing the number of projections 122 which pass a reference mark on the casing part 128 as the springs are being wound or unwound using the winding mechanism 110. Alternatively, other indicia may be provided on the tube 100 for use as a reference to indicate the number of revolutions or portions thereof of the tube and associated spring caused by operating the winding mechanism 110.

Figure 9:
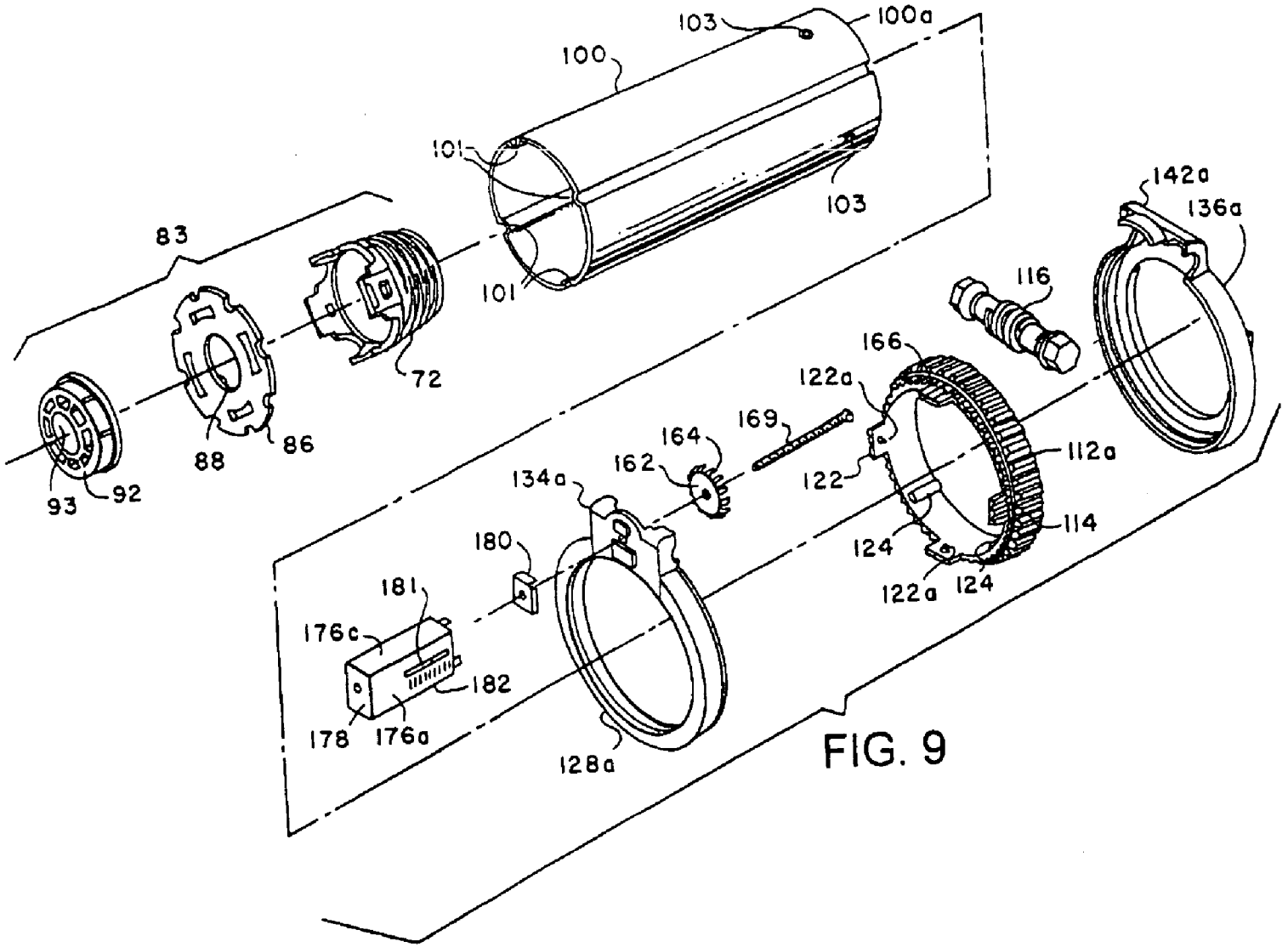
FIG. 9 is an exploded perspective view of a first alternate embodiment of a spring winding mechanism in accordance with the invention.
Figure 10:
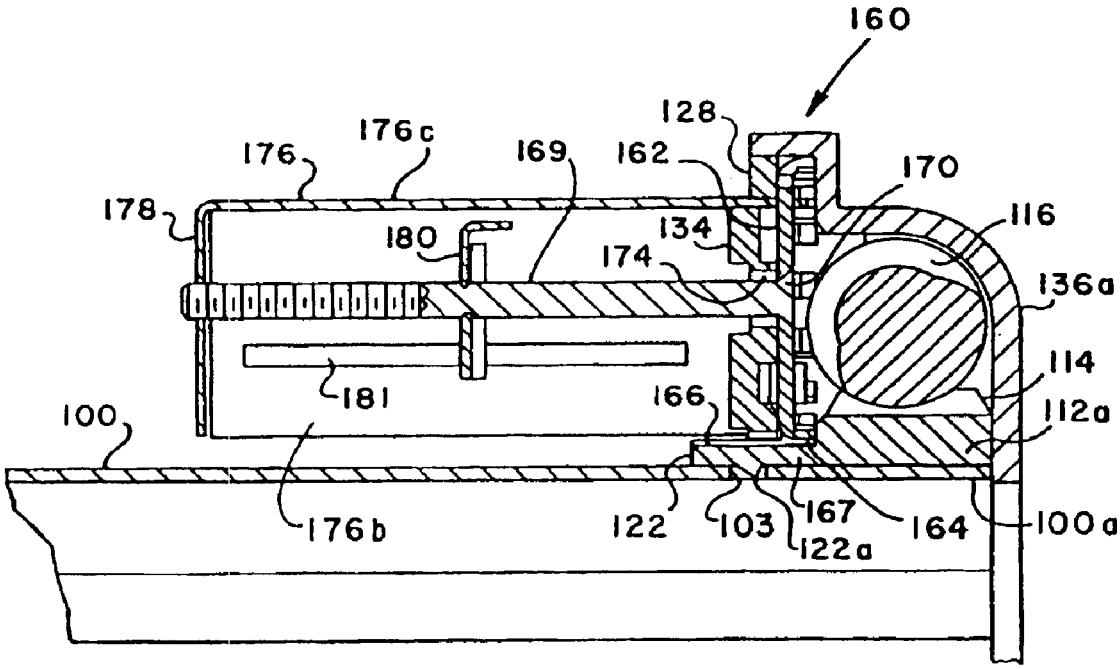
FIG. 10 is a central section view of a portion of the winding mechanism shown in FIG. 9 in an assembled condition to illustrate details of a spring winding counter mechanism.

Alternatively, if desired, a spring winding counter mechanism may be provided as shown, by way of example, in FIGS. 9 and 10. Referring to FIGS. 9 and 10, a counter mechanism 160 includes a pinion 162 having radially and axially projecting teeth 164 adapted to engage a secondary set of teeth 166 formed on a modified ring gear 112a, the teeth 166 may have a maximum diameter less than the root diameter of gear teeth 114. The teeth 166 are formed on an axially extending collar portion 167 of the ring gear 112a as shown. The pinion 162 is mounted on an elongated screw 169 at one end thereof by a suitable interfitting polygonal shaped tang portion 170 of the screw which fits in a corresponding polygonal shaped bore of the gear 162 in force fit relationship. The screw 169 also extends through a bore 174 which may be formed in the part 134a of a modified casing part 128a and extends through a generally rectangular hollow box shaped housing 176 mountable on part 134a of the casing part 128a. Casing parts 128a and 136a are provided for the embodiment shown in FIGS. 9 and 10 and are modified slightly from the configuration of casing parts 128 and 134 in regard to the parts 134a and 142a to accommodate the above-described counter mechanism.

As shown in FIG. 10, the screw 169 is also adapted to be supported in a suitable bore formed in an end wall 178 of housing 176. A square cross section, threaded nut 180 is mountable on the screw 169 as shown in FIG. 10, and disposed in the housing 176 in close fitting relationship to side walls 176a, 176b and a top wall 176c such that the nut 180 may translate linearly along the screw in response to rotation thereof but does not rotate relative to the housing 176. The counter housing 176 includes elongated axially extending slots 181 formed in the side walls 176a and 176b, respectively, for viewing the position of the nut 180 on the screw. Suitable indicia 182 may be provided on the side walls 176a and 176c, as shown in FIG. 9 by way of example, adjacent the slots 181 to provide a reference for the number of windings of the spring 78a or 78b associated with the spring winding mechanism and the associated counter.

Figure 11:
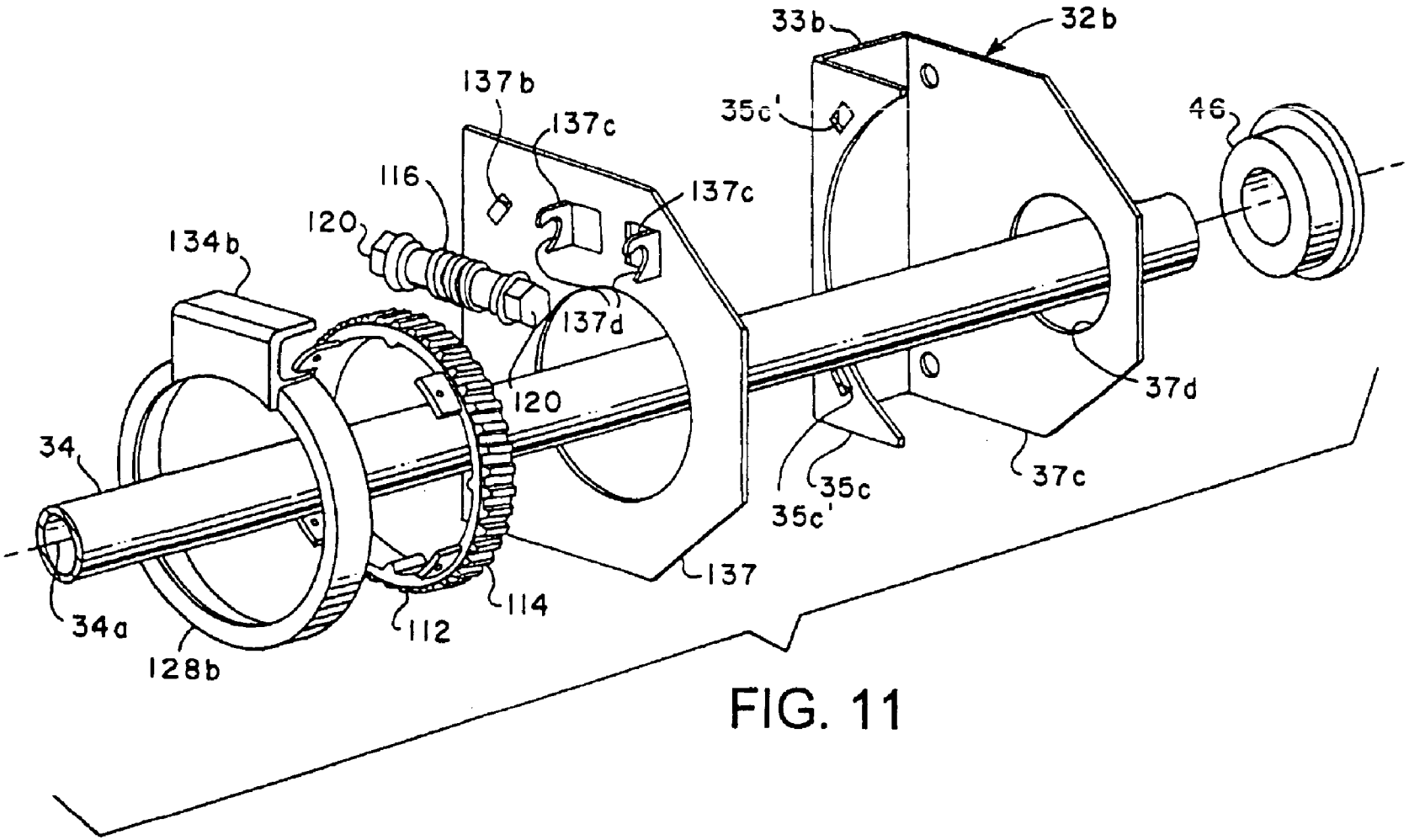
FIG. 11 is an exploded perspective view of another alternate embodiment of a winding mechanism and associated support structure.

Referring now to FIG. 11, there is illustrated a modified arrangement of a winding mechanism and associated support structure in accordance with the invention. In the embodiment illustrated in FIG. 11, certain components such as the torsion spring, the winding tube and the cable drum have been eliminated for the sake of clarity. As shown in FIG. 11, a modified wall support bracket 32b is illustrated having a base or central web portion 33b and opposed flanges 35c and 37c, respectively. Flange 37c is provided with a bore 37d for receiving the bearing assembly 46 directly therein in snug fitting relationship and for supporting the shaft 34 as with the previous embodiments. Flange 35c is adapted to releasably support a support plate 137 forming part of a support housing for a winding mechanism similar to the winding mechanism 110 and including a ring gear 112 and a worm gear 116. A casing part 128b is substituted for the casing part 128 and has a worm gear enclosure part 134b formed integral therewith. Support plate 137 is adapted to be releasably mounted on and fixed to the flange 35c. In this regard, spaced apart slots 35c' are adapted to receive tabs 137b on the plate 137, one shown in FIG. 11, which are adapted to be slipped into the slots 35c' and suitably retained fixed to the support bracket 32b. Alternatively, other suitable fasteners may be used to releasably secure the support plate 137 to the bracket 32b.

The support plate 137 is advantageously provided with two integral support tabs 137c which project substantially normal to the plane of the support plate and are provided with respective arcuate recesses 137d which are angled downwardly, as shown in FIG. 11, toward the axis of rotation 34a of the shaft 34 and the ring gear 112 and for journalling the worm gear 116 in the support tabs 137c. Casing part 128b is adapted to slip over and encompass the tabs 137c, specifically by the casing part 134b to form an enclosure for the ring gear 112 and the worm gear 116. The casing part 134b may be dimensioned to snap over the tabs 137c in a somewhat force fit relationship to aid in securing the casing part 128b to the support plate 137. Moreover, by angling the worm gear support recesses 137d, as shown, the worm gear 116 is first inserted in the recesses and supported by the tabs 137c and then the ring gear 112 is moved into a position meshed with the worm gear 116. In this way, the worm gear 116 cannot be dislodged from its support structure.

The arrangement illustrated in FIG. 11 and described above may be advantageous in that it eliminates a separate casing part for the winding mechanism casing as compared with the embodiments shown in FIGS. 7 and 9 and facilitates assembly and disassembly of the counterbalance system in some respects. Moreover, the support plate 137 may be separately mounted on a support structure such as the wall 22 independent of the support bracket 32b, if desired.

The construction and operation of the counterbalance system 30 is believed to be readily understandable to those of ordinary skill in the art based on the foregoing description. Conventional engineering materials used for garage door counterbalance mechanisms and the like may be used to fabricate the components of the system 30. The system 30 including the shaft 34, the cable drums 36, the springs 78a and 78b, the hub assemblies 83, the spring winding and protective tubes 100 and the winding mechanisms 110 may be pre-assembled and mounted on the wall brackets 32 after the wall brackets have been suitably mounted on the wall 22 in their designated positions. The bearing retainers 44 and the winding mechanism casings 127 may be merely slipped into the respective slots in the wall brackets 32 and retained therein by the weight of the system 30 itself as well as, of course, forces exerted on the mechanism by the cables 38, once torsional windings on the springs 78a and 78b has exerted a pre-determined counterbalance torque on the cable drums 36. The cables 38 may be attached to the door and to the drums 36 and the setscrews 64 positioned in their bores loosely so that the drums 36 may each be manually rotated on and relative to shaft 34 to take slack out of the cables 38.

At this time, a suitable manual or power tool may be adapted to engage one of the tangs 120 on one of the winding mechanisms to exert a torsional wind up of the associated torsion spring 78a or 78b until a pre-determined counterbalance effort is exerted on the cable drum connected thereto. The other torsion spring 78a or 78b may then be wound by its winding mechanism 110 until approximately the same number of turns of the winding mechanism is accomplished or the operator visually observes that the door 12 is virtually totally and evenly counterbalanced. The setscrews 64 may then be tightened on the shaft 34 so that the drums 36 rotate with the shaft in synchronization.

Figure 12:
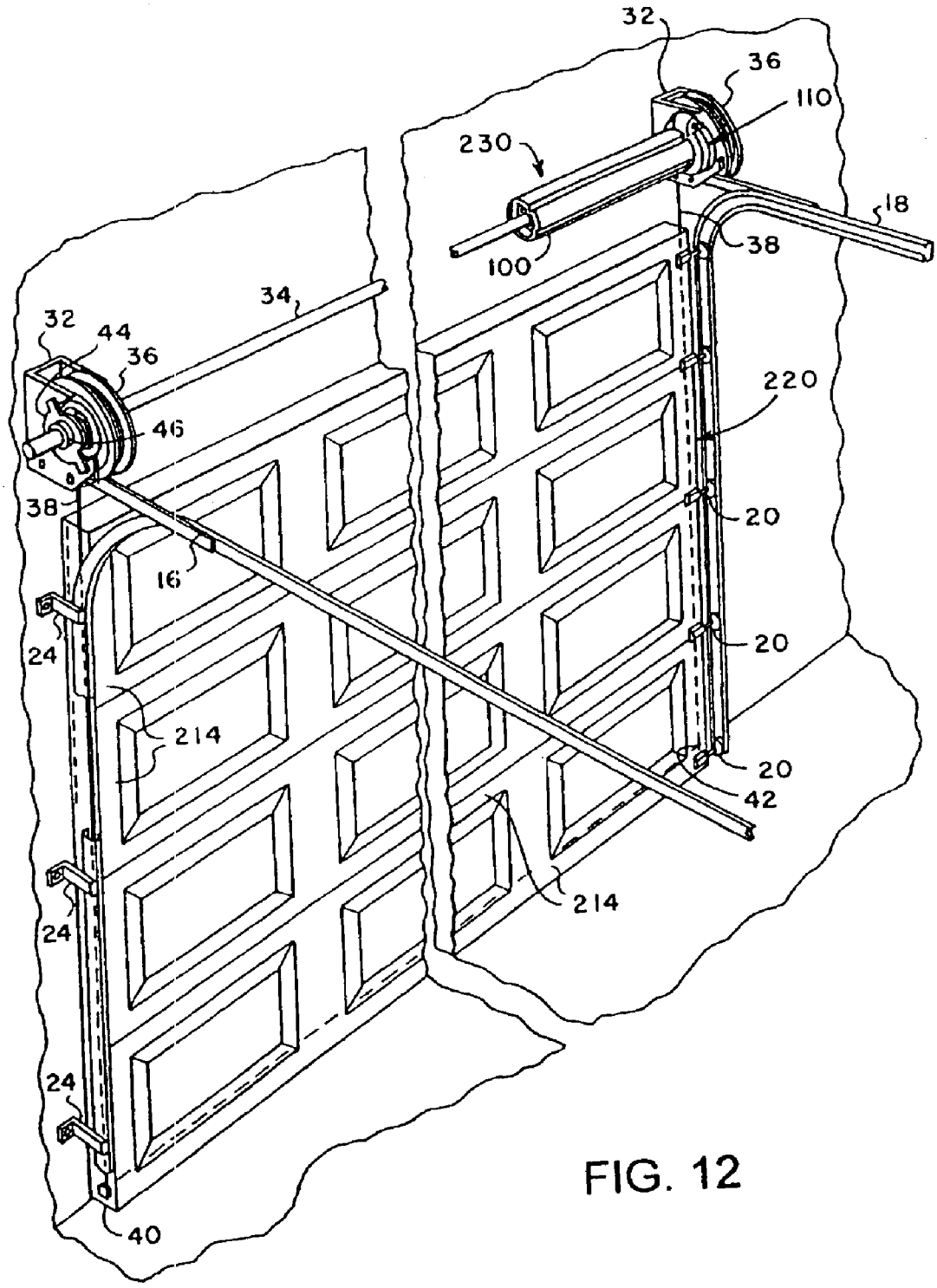
FIG. 12 is a perspective view of a sectional upward acting door counterbalance system in accordance with another preferred embodiment of the present invention.

Referring briefly to FIG. 12, there is illustrated an arrangement wherein a single car width garage door 220, for example, includes hingedly connected sections 214 which are similar to the sections 14 but may be of low enough weight such that a counterbalance mechanism 230 is associated therewith and requires only one torsion spring, tube 100 and associated winding mechanism 110, as illustrated. The other end of shaft 34 is thus only required to support a cable drum 36 without the requirement of a torsion spring attached thereto nor, of course, a winding mechanism 110, tube 100 or hub assembly 83. The cable drum 36 without the torsion spring and associated winding mechanism is, however, suitably supported on and connected for rotation with shaft 34. Shaft 34 is supported on the wall brackets 32 by bearing assemblies 46 and associated retainer and support members 44, as shown. In all other aspects, the counterbalance system 230 is substantially like the counterbalance system 30.

Although preferred embodiments of the invention have been described in detail herein, those skilled in the art will recognize that various substitutions and modifications may be made to the counterbalance systems described without departing from the scope and spirit of the invention as recited in the appended claims.

What is claimed is:

1. A counterbalance system for an upward acting door for counterbalancing at least part of the weight of said door when said door is moved between open and closed positions, said system comprising:

rotatable drums interconnected by an elongated shaft and supported on spaced-apart brackets adapted to be supported, respectively, generally above and adjacent to said door, said drums having flexible members wound thereon, respectively, the free ends of said flexible members depending from said drums and adapted to be connected to said door, respectively;

a torsion spring mounted on said shaft between said drums having opposed end portions, one of said end portions being connected to one of said drums;

an elongated tube disposed in sleeved relationship over said spring and operably connected to the other end portion of said spring; and a winding mechanism including a part held stationary with respect to *one of* said [bracket] *brackets* and operatively connected to said tube and operable to hold said tube stationary during normal operation of said counterbalance system, said winding mechanism being operable to rotate said tube, which rotates said other end portion of said spring to adjust the torque applied by said spring to said one drum.

2. The counterbalance system set forth in claim 1 wherein:

said part of said winding mechanism includes a casing including a first gear supported for rotation on said casing and a second gear connected to said tube non-rotatable relative to said tube and drivenly engaged with said first gear.

3. The counterbalance system set forth in claim 2 wherein:

said first and second gears comprise a worm *gear* and a ring gear meshed with said worm *gear*, respectively.

4. The counterbalance system set forth in claim 3 including:

a counter mechanism associated with said winding mechanism and operable to indicate the number of torsional windings imparted to said spring by said winding mechanism.

5. The counterbalance system set forth in claim 4 wherein:

said counter mechanism includes a pinion engaged with one of said gears of said winding mechanism and with a member which is translatable in response to rotation of said pinion and said spring to indicate the number of torsional windings imparted to said spring.

6. The counterbalance system set forth in claim 2 including:

indicia means on at least one of said casing and said tube for indicating the number of revolutions of said tube, or a portion thereof, with respect to said casing in response to operation of said winding mechanism to rotate said tube and said other end portion of said spring.

7. The counterbalance system set forth in claim 1 wherein:

said part of said winding mechanism includes a casing part supported on one of said brackets for holding said winding mechanism stationary with respect to said one bracket.

8. The counterbalance system set forth in claim 7 wherein:

said casing part includes a support plate adapted to be releasably connected to one of said brackets or to a stationary support structure and said winding mechanism includes a second casing part adapted to be releasably connected to said support plate for enclosing part of said winding mechanism.

9. The counterbalance system set forth in claim 8 wherein:

said winding mechanism includes a first gear drivingly connected to said tube and a second gear meshed with said first gear and supported by said support plate.

10. The counterbalance system set forth in claim 9 wherein:

said second gear comprises a worm gear having opposed trunnion portions and said support plate includes spaced apart support parts adapted to support said worm gear thereon for rotation relative to said support plate.

11. The counterbalance system set forth in claim 10 wherein:

said support parts on said support plate include opposed arcuate recesses extending at an angle with respect to the plane of said support plate for retaining said worm gear on said support plate when said worm gear is meshed with said ring gear.

12. The counterbalance system set forth in claim 1 wherein:

said drums are mounted on said shaft extending between and supported on said spaced apart brackets by respective spaced apart bearings, each of said bearings being engageable with said shaft, and respective spaced apart bearing retainers engageable with respective ones of said brackets and with said bearings, respectively.

13. The counterbalance system set forth in claim 12 wherein:

said brackets each include at least one flange projecting outwardly from a base part of said bracket and having an inclined slot formed therein for receiving said retainer slidably disposed therein and engageable with said flange in a working position of said counterbalance system.

14. The counterbalance system set forth in claim 13 wherein:

said part of said winding mechanism includes a casing enclosing a gear drive mechanism connected to said tube, and a flange formed on said casing and engageable with a second flange of one of said brackets for supporting said winding mechanism non-rotatably on said one bracket.

15. The counterbalance system set forth in claim 14 wherein:

said second flange of said one bracket includes an inclined slot for receiving said casing of said winding mechanism for retaining said casing non-rotatably with respect to said second flange of said one bracket.

16. The counterbalance system set forth in claim 1 wherein:

said spring comprises a coil spring and said other end portion of said spring is secured to a hub assembly including a hub member engageable with at least one coil of said spring for securing said hub member to said spring and a key plate connected to said hub member and engageable with said tube by cooperating means to prevent rotation of said hub assembly with respect to said tube.

17. The counterbalance system set forth in claim 16 wherein:

said cooperating means to prevent rotation of said hub assembly with respect to said tube comprises spaced apart axially extending keys formed on said tube registrable in cooperating slots formed on said key plate to prevent rotation of said hub assembly with respect to said tube while allowing said hub assembly and said other end portion of said spring to translate axially with respect to said tube.

18. The counterbalance system set forth in claim 17 wherein:

said hub assembly includes a bushing member connected to said hub member and said key plate and including a central bore formed therein for receiving [a] *said* shaft extending between and supported on *said* spaced apart support brackets for said system.

19. The counterbalance system set forth in claim 18 wherein:

said shaft is releasably connected to said cable drums for synchronizing the rotation of said cable drums with respect to each other during opening and closing of said door.

20. The counterbalance system set forth in claim 1 wherein:

said counterbalance system includes another torsion spring connected at one end portion to the other of said drums, and to another elongated tube disposed in sleeved relationship over said other spring; and another winding mechanism including a part held stationary with respect to said bracket and operatively connected to said other tube and operable to hold said other tube stationary during normal operation of said counterbalance system, said winding mechanisms each being operable to rotate its associated tube to rotate the other end of the associated spring to adjust the torque applied by said springs to said drums, respectively.

21. The counterbalance system set forth in claim 20 wherein:

said tubes each include at least one elongated axially extending key formed thereon and said springs are each connected to a hub assembly, each said hub assembly including a key plate having at least one keyway formed therein for engaging said keyplate with said key on said tube to prevent rotation of said hub assembly with respect to said tube.

22. The counterbalance system set forth in claim 21 wherein:

each said hub assembly includes a bore therein for supporting said hub assembly on [an] *said* shaft extending between said brackets and supported on said brackets by spaced-apart bearings, respectively, and each said hub assembly is supported on said shaft for rotation and axial translation relative to said shaft.

23. The counterbalance system set forth in claim 22 wherein:

said drums are mounted on said shaft and include means for releasably connecting said drums to said shaft, respectively, for rotation therewith.

24. A counterbalance system for counterbalancing at least part of the weight of an upward acting door when said door is moved between open and closed positions, said counterbalance system comprising:

spaced-apart brackets adapted to be mounted generally above and adjacent to said door;

an elongated shaft extending between and supported on said brackets;

opposed drums supported on said shaft, respectively, and releasably securable to said shaft for rotation in synchronization with each other, each of said drums including a flexible member wound thereon, said flexible members being adapted to be connected at a free end depending from said drums to said door, respectively;

each of said drums including a hub portion connected to one end of a torsion coil spring, each of said springs extending axially from said hub portions of said drums toward each other;

opposed hub assemblies connected to the ends of said springs, respectively, opposite the ends connected to said drums and mounted in sleeved relationship over said shaft for rotation relative to said shaft;

elongated spring winding tubes operably supported by said brackets and disposed in sleeved relationship over said springs and said shaft, respectively, said tubes extending toward each other between said brackets, each of said tubes being connected to a respective one of said hub assemblies nonrotatably and for holding said ends of said springs nonrotatable with respect to said brackets, respectively; and spring winding mechanisms operably connected to each of said tubes and to one of said brackets, respectively, for holding said tubes, respectively, stationary during operation of said counterbalance system to counterbalance the weight of said door and for adjusting the torsional windup of said springs by selectively rotating respective ones of said tubes to rotate said hub assemblies and said ends of said springs, respectively, opposite the ends connected to said drums.

25. The counterbalance system set forth in claim 24 wherein:

said winding mechanisms include cooperating gears operable to rotate said tubes relative to said brackets, respectively, to effect torsional winding of said springs, respectively.

26. The counterbalance system set forth in claim 25 wherein:

one of said gears of each of said winding mechanisms is connected to one of said tubes for rotation therewith.

27. The counterbalance system set forth in claim 26 wherein:

said one gear comprises a ring gear having a plurality of circumferentially spaced key parts cooperable with keyways formed in said tube whereby said ring gear and said tube are connected to each other for rotation of said tube in response to rotation of said ring gear.

28. The counterbalance system set forth in claim 27 wherein:

said ring gear and said tube have cooperating bosses and recesses formed thereon, respectively, for securing said ring gear to said tube in a predetermined position thereon.

29. The counterbalance system set forth in claim 24 wherein:

said shaft is mounted on spaced apart bearing assemblies, said bearing assemblies are mounted, respectively, on said brackets, respectively.

30. In a counterbalance system for counterbalancing at least part of the weight of an upward acting door, spaced apart brackets adapted to be mounted on a wall generally above and adjacent to said door, opposed drums supported on said brackets, respectively, for rotation with respect to said brackets, each of said drums including a flexible member wound thereon, said flexible members each being adapted to be connected at an end of said flexible member depending from said drum to said door, each of said drums including a hub portion operably connected to one end of a spring, opposed hub assemblies connected to opposite ends of said springs, respectively, and opposed elongated tubes disposed in sleeved relationship over said springs, respectively, and adapted to be supported stationary with respect to said [wail] *wall* and connected to said hub assemblies, respectively, for holding said hub assemblies stationary to anchor said opposite ends of said springs.

31. The counterbalance system set forth in claim 30 including:

spring winding mechanisms connected to said tubes for rotating said tubes and said hub assemblies to effect winding said springs, respectively.

32. The counterbalance system set forth in claim 31 wherein:

said spring winding mechanisms are mounted on said brackets, respectively.

33. The counterbalance system set forth in claim 31 wherein:

said hub assemblies are connected to said tubes for axial sliding movement with respect to said tubes but are non-rotatable relative to said tubes, respectively.

*34. A counterbalance system for an upward acting door for counterbalancing at least part of the weight of said door when said door is moved between open and closed positions, said system comprising:*

*rotatable drums interconnected by an elongated shaft and supported on spaced-apart brackets adapted to be supported, respectively, generally near a top of and adjacent to said door, said drums having flexible members wound thereon, respectively, the free ends of said flexible members depending from said drums and adapted to be connected to said door, respectively;*

*a torsion spring having opposed end portions and mounted on said shaft between said drums, one of said end portions being in a fixed relationship with respect to one of said drums;*

*a tubular member disposed in sleeved relationship over at least a portion of said spring and operatively connected to the other end portion of said spring; and*

*a winding mechanism including a first gear drivingly connected to said tubular member and a second gear meshed with said first gear, said gears being operable to hold said tubular member stationary during normal operation of said counterbalance system, said winding mechanism being operable to rotate said tubular member, which rotates said other end portion of said spring to adjust the torque applied by said spring to said one drum.*

*35. A counterbalance system for an upward acting door for counterbalancing at least part of the weight of said door when said door is moved between open and closed positions, said system comprising:*

*rotatable drums interconnected by an elongated shaft and supported on spaced-apart brackets adapted to be supported, respectively, generally near a top of and adjacent to said door, said drums having flexible members wound thereon, respectively, the free ends of said flexible members depending from said drums and adapted to be connected to said door, respectively;*

*at least one torsion spring disposed around a portion of said shaft between said drums for applying a torque to rotate at least one of said drums;*

*a tubular member disposed in a sleeved relationship with respect to said spring and said shaft and operatively connected with an end portion of said spring; and*

*a winding mechanism including a first gear drivingly connected to said tubular member and a second gear meshed with said first gear, said gears being operable to hold said tubular member stationary during normal operation of said counterbalance system, said winding mechanism being operable to rotate said tubular member, which rotates said end portion of said spring to adjust the torque applied by said spring to said at least one drum.*

*36. A counterbalance system for an upward acting door for counterbalancing at least part of the weight of said door when said door is moved between open and closed positions, said system comprising:*

*rotatable members interconnected by an elongated shaft and supported on spaced-apart brackets adapted to be supported, respectively, generally near a top of and adjacent to said door, said rotatable members having flexible members wound thereon, respectively, the free ends of said flexible members depending from said rotatable members and adapted to be connected to said door, respectively;*

*at least one torsion spring mounted on a portion of said shaft between said rotatable members for applying a torque to rotate at least one of said rotatable members;*

*a tubular member axially disposed with respect to said shaft and operatively connected to said spring; and*

*a winding mechanism including a first gear drivingly connected to said tubular member and a second gear meshed with said first gear, said gears being operable to hold said tubular member stationary during normal operation of said counterbalance system, said winding mechanism being operable to rotate said tubular member, which rotates said at least one spring to adjust the torque applied by said at least one spring to at least one of said rotatable members;*

*said tubular member serving as a torque carrying coupling between said winding mechanism and said torsion spring.*

* * * * *